(12) United States Patent
Nguyen et al.

(10) Patent No.: US 6,219,703 B1
(45) Date of Patent: *Apr. 17, 2001

(54) METHOD AND APPARATUS FOR CONSTRUCTING A DEVICE MANAGEMENT INFORMATION BASE IN A NETWORK MANAGEMENT STATION

(75) Inventors: Cuong The Nguyen, Dallas; Srinivas Miriyala, Arlington; James Alan Starkweather, Grapevine, all of TX (US)

(73) Assignee: Motorola, Inc., Schaumburg, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/740,635

(22) Filed: Oct. 31, 1996

(51) Int. Cl.[7] .................................................. G06F 13/00
(52) U.S. Cl. .............................................. 709/224; 709/226
(58) Field of Search ........................... 395/615, 200.01, 395/200.09, 182.18; 370/399; 709/226, 235, 202, 230, 223, 201; 707/515, 101; 379/34

(56) References Cited

U.S. PATENT DOCUMENTS

| 5,291,583 | * | 3/1994 | Bapat ......................................... 717/5 |
| 5,491,796 | * | 2/1996 | Wanderer et al. ............... 395/200.09 |
| 5,517,622 | * | 5/1996 | Ivanoff et al. ......................... 709/230 |
| 5,522,042 | * | 5/1996 | Fee et al. ................................ 709/226 |
| 5,561,769 | * | 10/1996 | Kumar et al. ......................... 709/202 |
| 5,586,255 | * | 12/1996 | Tanaka et al. ................... 395/200.01 |
| 5,651,006 | * | 7/1997 | Fujino et al. ......................... 370/408 |
| 5,655,081 | * | 8/1997 | Bonnell et al. ....................... 709/202 |
| 5,684,988 | * | 11/1997 | Pitchaikani et al. ................. 707/104 |
| 5,706,440 | * | 1/1998 | Compliment et al. ............... 709/224 |
| 5,734,818 | * | 3/1998 | Kern et al. ........................ 395/182.18 |
| 5,745,897 | * | 4/1998 | Perkins et al. ........................ 707/101 |
| 5,754,849 | * | 5/1998 | Dyer et al. ............................. 395/612 |
| 5,768,532 | * | 6/1998 | Megrian ................................ 709/235 |
| 5,774,669 | * | 6/1998 | George et al. ........................ 709/224 |
| 5,790,789 | * | 8/1998 | Suarez ................................... 709/202 |
| 5,796,736 | * | 8/1998 | Suzuki .................................. 370/399 |
| 5,813,020 | * | 9/1998 | Hohensee et al. .................... 707/515 |
| 5,913,037 | * | 6/1999 | Spofford et al. ...................... 709/226 |
| 5,966,531 | * | 10/1999 | Skeen et al. .......................... 395/683 |

OTHER PUBLICATIONS

Case, UPS Management Information Base, RFC 1628, May 1994.*

SNMP, J.Case et al, May 1990.*

* cited by examiner

*Primary Examiner*—Robert B. Harrell
*Assistant Examiner*—Thong Vu
(74) *Attorney, Agent, or Firm*—R. Louis Breeden

(57) ABSTRACT

In a data communication network a network management station (NMS) (102) constructs a device Management Information Base (MIB) for interfacing with a device (104) to be managed. The device provides an agent (110) that includes a management structure MIB (114) including data describing a device MIB structure supported by the device. The NMS is programmed with an application (108) that can interpret the data of the management structure MIB in order to construct the device MIB. The NMS detects (502) that the device is present on the network, and, in response, accesses (508, 510, 512, 514) the management structure MIB to obtain the data describing the device MIB structure, when the device MIB is not known to the NMS. The NMS application interprets the data describing the device MIB structure, and constructs (516) the device MIB from the interpreted data.

20 Claims, 3 Drawing Sheets

METHOD AND APPARATUS FOR CONSTRUCTING A DEVICE MANAGEMENT INFORMATION BASE IN A NETWORK MANAGEMENT STATION

FIELD OF THE INVENTION

This invention relates in general to data communication networks, and more specifically to a method and apparatus in a data communication network for constructing a device management information base in a network management station.

BACKGROUND OF THE INVENTION

Currently in a Simple Network Management Protocol (SNMP) management environment, the term "auto-discovery" refers to the ability of a Network Management Station (NMS) to automatically detect or discover an Internet Protocol (IP) addressable device in a network. The NMS can also identify a device that is SNMP manageable (if the device supports at least the System module for SNMP MIB II).

Once a device is discovered, it can be managed only if its management information base (MIB) is available and has been previously loaded into the NMS. If the MIB is not available, a vendor must be contacted to obtain the required MIB. This process may take hours to days for completion. Until the MIB is obtained, the discovered device is not manageable. Another problem that can arise is if the MIB for the discovered device is not of the correct version, then the NMS may not be able to coherently manage the features of the device.

Thus, what is needed is a method and apparatus that can enable the NMS not only to discover the existence of an IP device, but also to extract the MIB information from the device. Preferably the method and apparatus will utilize existing SNMP methods for communicating between the NMS and the device, so that no additional protocols or connections are required for extracting the MIB information.

SUMMARY OF THE INVENTION

An aspect of the present invention is a method in a data communication network having a network management station (NMS) for constructing in the NMS a device Management Information Base (MIB) for interfacing with a device. The method comprises the steps of providing in the device an agent that includes a management structure MIB comprising data describing a device MIB structure supported by the device, and programming the NMS with an application that can interpret the data of the management structure MIB in order to construct the device MIB. The method further comprises the steps of detecting by the NMS that the device is present on the network, and accessing the management structure MIB by the NMS to obtain the data describing the device MIB structure, in response to the detecting step when the device MIB is not known to the NMS. The method also includes the step of interpreting by the application the data describing the device MIB structure, thereby constructing the device MIB.

Another aspect of the present invention is a network management station (NMS) in a data communication network for constructing in the NMS a device Management Information Base (MIB) for interfacing with a device. The NMS comprises a communication interface coupled to the network for communicating with the device, and a processing system coupled to the communication interface for controlling the device. The processing system is programmed to interpret the data of a management structure MIB in order to construct the device MIB. The management structure MIB is provided by the device from an agent that includes the management structure MIB, which provides data describing a device MIB structure supported by the device. The processing system is further programmed to detect that the device is present on the network, and, in response, to access the management structure MIB to obtain the data describing the device MIB structure, when the device MIB is not known to the NMS. In addition, the processing system is programmed to interpret the data describing the device MIB structure, thereby constructing the device MIB.

Another aspect of the present invention is a device in a data communication network having a network management station (NMS) for constructing in the NMS a device Management Information Base (MIB) for interfacing with the device. The device comprises a communication interface coupled to the network for communicating with the NMS, and a processing system coupled to the communication interface for controlling the device. The processing system is programmed with an agent including a management structure MIB, which provides data describing a device MIB structure supported by the device. The processing system is further programmed to communicate to the NMS the data describing the device MIB structure, in response to an access of the management structure MIB by the NMS when the device MIB is not known to the NMS, thereby enabling the NMS to construct the device MIB.

DESCRIPTION OF THE PREFERRED EMBODIMENT

Figure 1:
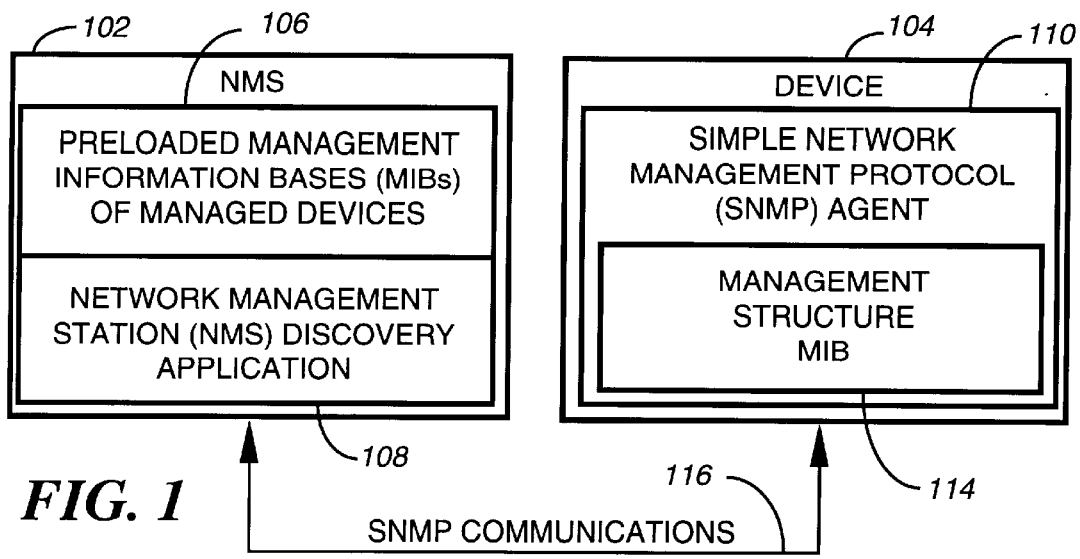
FIG. 1 is a software block diagram of a portion of a network comprising a Network Management Station (NMS) and a device in accordance with the present invention.

Referring to FIG. 1, a software block diagram depicts a portion of a network comprising a Network Management Station (NMS) 102 and a device 104 to be managed by the NMS 102 in accordance with the present invention. The NMS 102 comprises preloaded Management Information Bases (MIBs) 106 for devices 104 managed by the NMS 102. In addition, the NMS 102 comprises an NMS discovery application 108. The device 104 comprises a Simple Network Management Protocol (SNMP) agent 110 that includes a management structure MIB 114, which provides data describing a device MIB structure supported by the device 104. In accordance with the present invention, the NMS discovery application 108 programs a processing system 304 (FIG. 3) of the NMS 102 to detect that the device 104 is present on the network, preferably through conventional IP discovery techniques, and, in response, to access the management structure MIB 114 to obtain the data describing the device MIB structure, when the device MIB is not known to the NMS 102. The NMS discovery application 108 further programs the processing system 304 to interpret the data of the management structure MIB 114 in order to construct a device MIB for managing the device 104. Preferably, the NMS 102 accesses the management structure MIB 114 in cooperation with the SNMP agent 110 by utilizing conventional SNMP communications through a conventional communication link 116. It will be appreciated that, alternatively, the NMS discovery application 108 can be arranged to handle only the accessing of the management structure MIB 114 and the interpreting of the data of the management structure MIB 114 in order to construct the device MIB. In this case, a conventional IP discovery application can be utilized to detect that the device 104 is present on the network.

Figure 2:
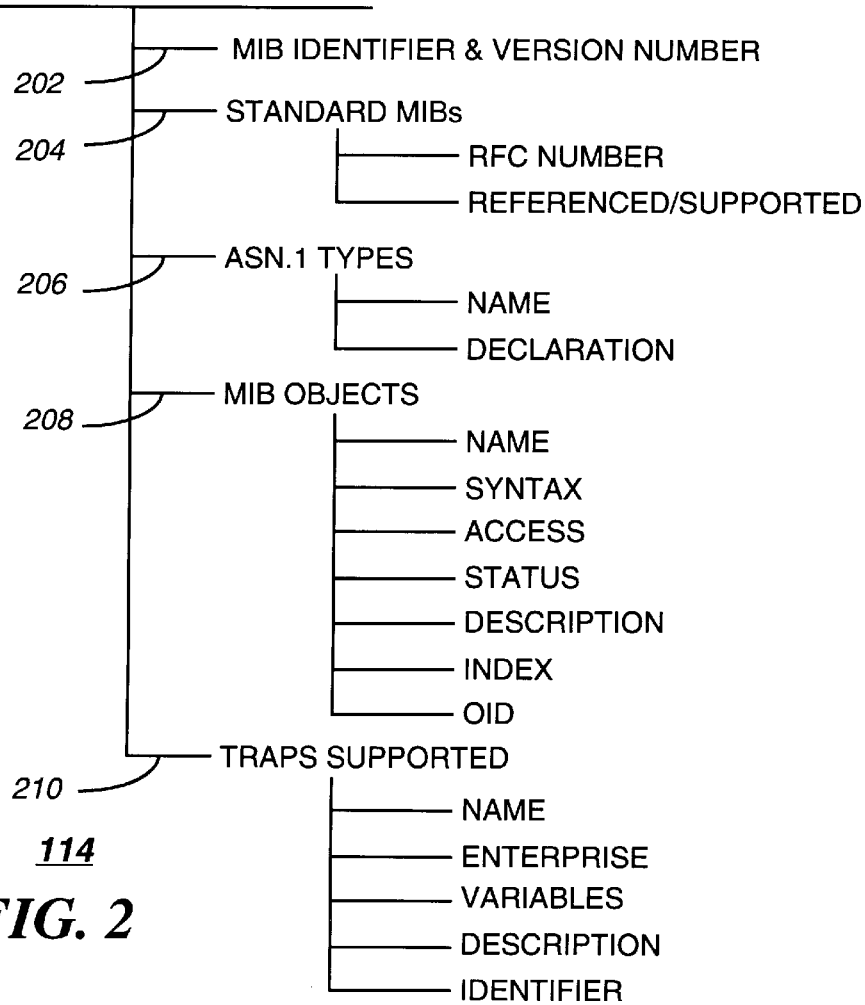
FIG. 2 is a diagram depicting the contents of a management structure MIB in accordance with the present invention.

FIG. 2 is a diagram depicting the contents of the management structure MIB 114 in accordance with the present invention. The management structure MIB 114 is a MIB that preferably is implemented by all devices 104 that are intended to support MIB discovery. The management structure MIB includes four tables and a variable 202 representing the MIB identifier and version number. Detailed descriptions of the tables are presented below.

The standard MIBs table 204 defines all the standard MIBs that are supported or required for operation of the agent 110. If the agent 110 supports only standard MIBs, then the only table required by the agent 110 is this one and the rest of the tables can be empty. The standard MIBs table 204 simply lists all of the Request for Comments (RFC) numbers which identify all the standard MIBs that are supported by the agent 110. This list also includes all the RFCs that the agent 110 references. For example, if the agent 110 requires a definition of a variable type from a standard MIB, then the referenced MIB must be included. The Referenced/Supported flag indicates whether the listed standard MIB is merely referenced or directly supported by the agent 110.

The Abstract Syntax Notation One (ASN.1) types table 206 identifies all the ASN.1 types that are defined by the agent 110. Types that are referenced from standard MIBs are not specified here. Each entry in the table 206 identifies a single type by its name and how it is declared. The table 206 should identify all defined types including OBJECT-IDENTIFIER macros, and SEQUENCE lists for table entries.

The MIB objects table 208 identifies all the MIB objects that are supported by the agent 110. Each entry in the table 208 identifies a single MIB object. The fields of the entries correspond directly to each of the required fields for defining an SNMP object. The OID field may be specified with the OBJECT-IDENTIFIER macro as specified in the ASN.1 types table 206. The Index field is valid only if the MIB object defines an entry of a table. In this case the Index field lists the indexes of the table. If the Index field is NULL, then the MIB object is not a description for an entry of a table.

The Traps supported table 210 identifies all the traps that are supported by the agent 110. Each entry in the table 210 identifies one trap. The fields of each entry correspond directly to the fields required for defining an SNMP trap. The Identifier field should be the trap enterprise specific ID.

Figure 3:
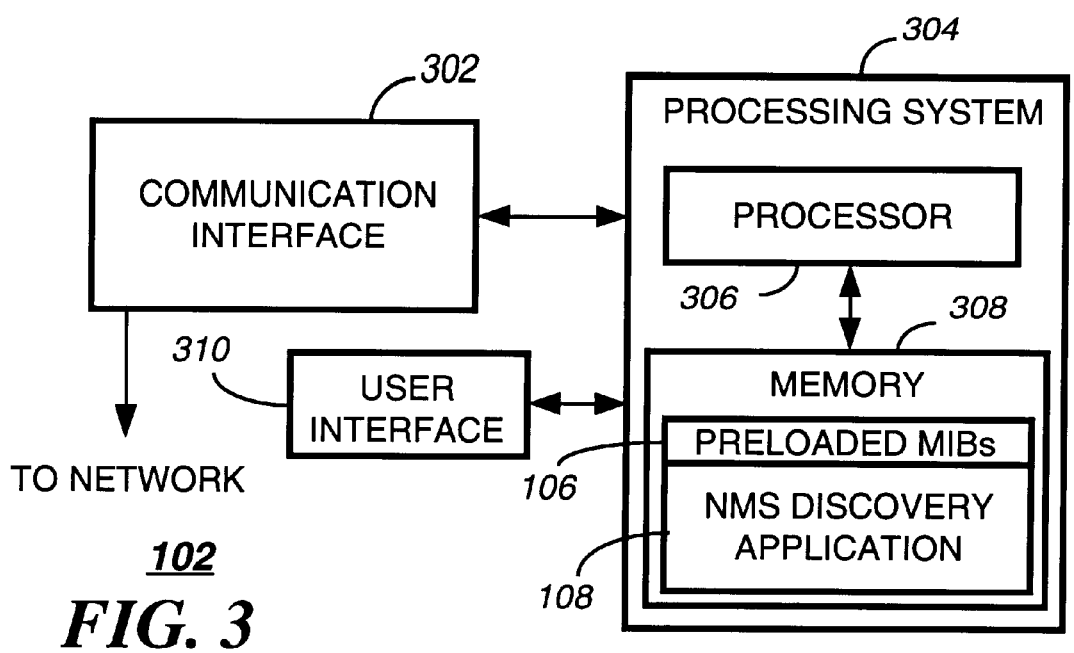
FIG. 3 is an electrical block diagram of the NMS in accordance with the present invention.

FIG. 3 is an electrical block diagram of the NMS 102 in accordance with the present invention. The NMS 102 comprises a conventional communication interface 302 for communicating with the device 104 through a network (not shown). The communication interface 302 is coupled to a processing system 304 for processing the communications and for controlling the NMS 102. The processing system 304 comprises a conventional processor 306 and a conventional memory 308. The memory 308 is programmed with the preloaded MIBs 106 and NMS discovery application 108 in accordance with the present invention. A user interface 310, e.g., a conventional video display terminal, is coupled to the processing system 304 for providing user access to the NMS 102.

Figure 4:
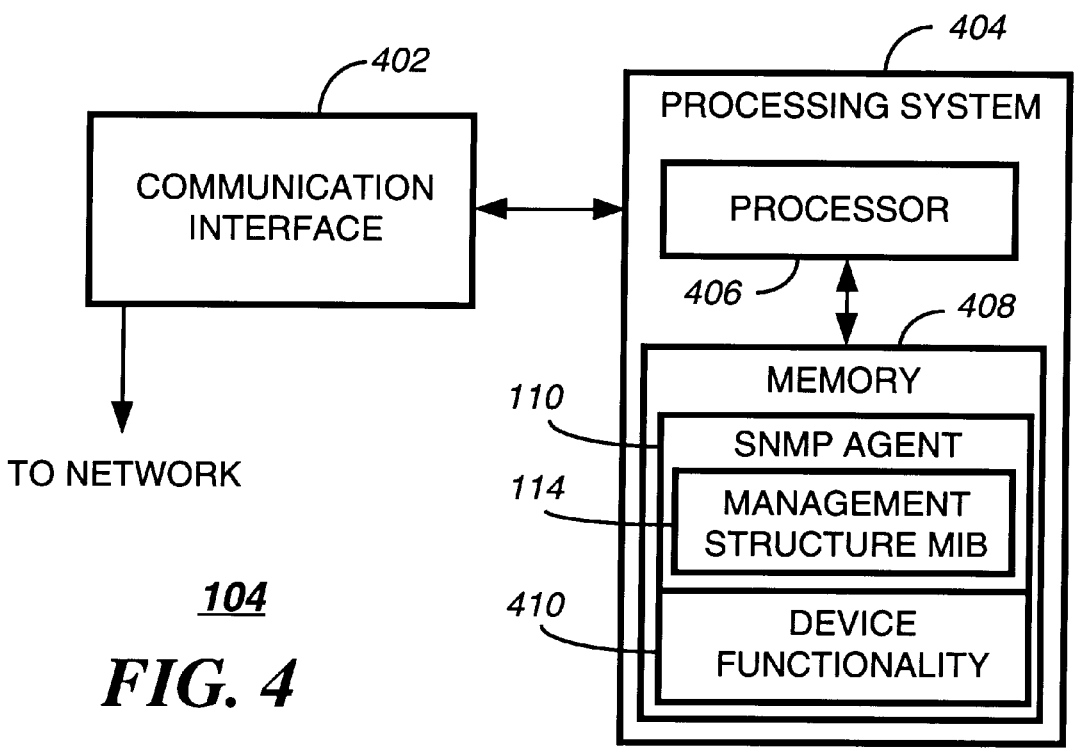
FIG. 4 is an electrical block diagram of the device in accordance with the present invention.

FIG. 4 is an electrical block diagram of the device 104 in accordance with the present invention. The device 104 comprises a conventional communication interface 402 for communicating with the NMS 102 through the network. The communication interface 402 is coupled to a processing system 404 for processing the communications and for controlling the device 104. The processing system 404 comprises a conventional processor 406 and a conventional memory 408. The memory 408 is programmed with the SNMP agent 110, which includes the management structure MIB 114. The memory 408 is also programmed with a device functionality element 410, which defines the functionality of the device 104. For example, if the device 104 is a router, the device functionality element 410 can include routing tables and code for providing a routing function.

Figure 5:
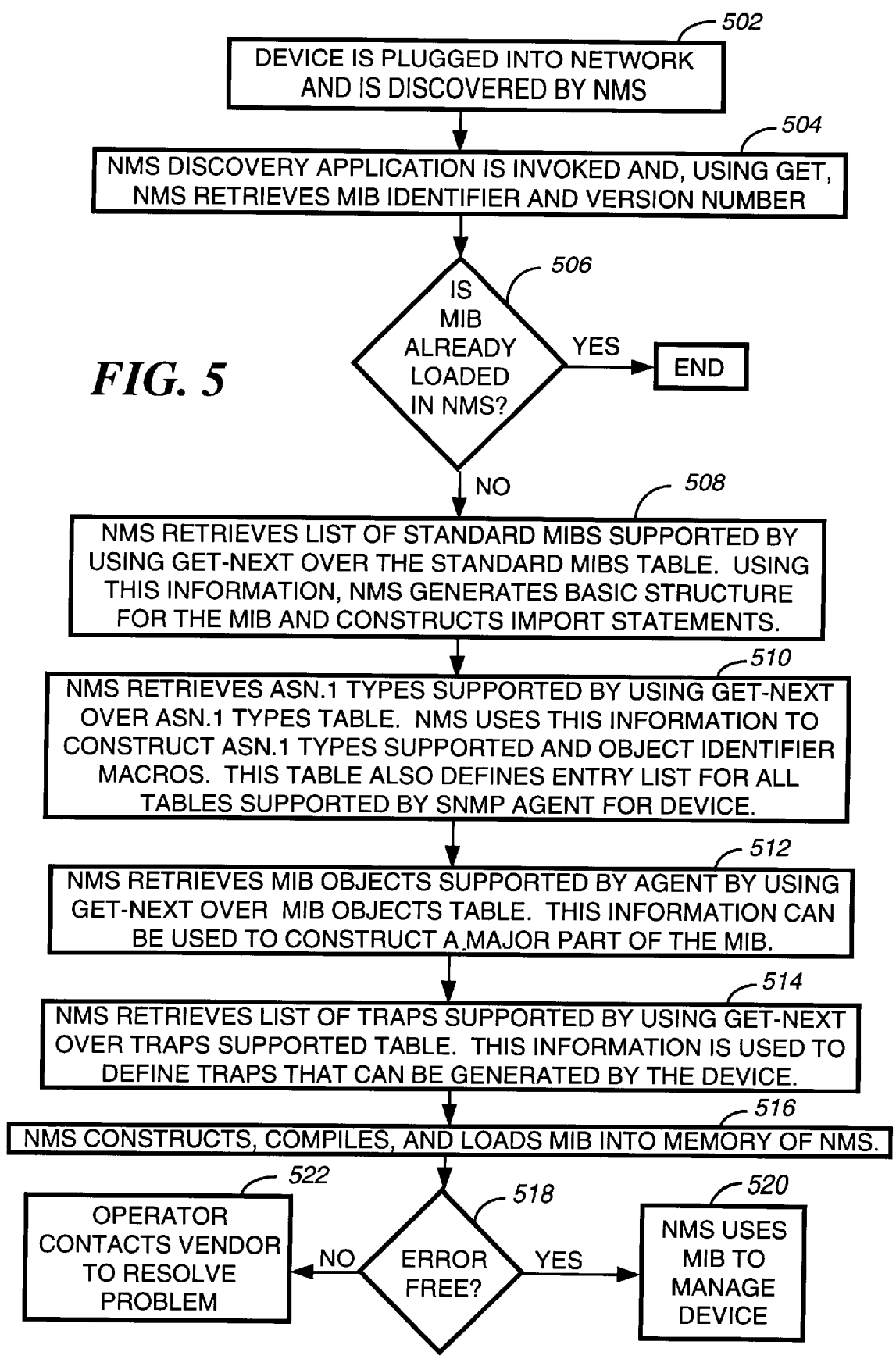
FIG. 5 is a flow chart depicting operation of the NMS and the device in accordance with the present invention.

FIG. 5 is a flow chart depicting operation of the NMS 102 and the device 104 in accordance with the present invention. The flow begins when the device 104 is plugged into the network and is discovered 502 by the NMS 102, preferably through conventional IP discovery techniques. In response, the NMS discovery application is invoked 504, and using a conventional SNMP GET command, the NMS 102 retrieves the variable 202 representing the MIB identifier and version number. The processing system 304 of the NMS 102 then compares the MIB identifier and version number to determine 506 whether the MIB has already been loaded into the NMS 102. If so, nothing further needs to be done, and the process ends. If, however, the MIB has not been loaded, the processing system 304 then retrieves 508 from the device 104 the list of standard MIBs supported by the agent 110 by using a conventional SNMP GET-NEXT command over the standard MIBs table 204. Using this information, the basic structure for the MIB can be generated and the IMPORT statements constructed.

Next, the processing system 304 retrieves 510 the ASN.1 types supported by using the GET-NEXT command over the ASN.1 types table. This information is used to construct the ASN.1 types supported and the object identifier macros. This table also defines the entry list for all tables supported by the SNMP agent for the device. Next, the processing system 304 retrieves 512 the MIB objects supported by the agent by using the GET-NEXT command over the MIB objects table. This information is used to construct the major part of the MIB. Finally, the processing system 304 retrieves 514 the lists of traps supported by using the GET-NEXT command over the traps supported table. This information is used to define the list of traps that can be generated by the device. After completing the above steps, the processing system 304 constructs, compiles, and loads the MIB into the memory 308 of the NMS 102. If in step 518 the MIB is determined through well-known techniques to be error free, then the NMS proceeds to use the MIB to manage the device 104. If an error is found, then the device vendor must be contacted 522 by the system operator.

Thus it should be apparent by now that the present invention provides a powerful and useful feature for management of a large network. With the present invention software and MIB versioning is much simplified and easily managed. The present invention advantageously provides "plug-and-play" of network equipment. The present invention provides a method and apparatus that can enable the NMS not only to discover the existence of an IP device, but also to extract the MIB information from the device. Advantageously, the method and apparatus utilizes existing SNMP methods for communicating between the NMS and the device, so that no additional protocols or connections are required for extracting the MIB information.

What is claimed is:

1. A method in a data communication network having a network management station (NMS) for constructing in the NMS a device Management Information Base (MIB) for interfacing with a device, comprising the steps of:

providing in the device an agent that includes a self-describing management structure MIB comprising data describing a device MIB structure supported by the device;

programming the NMS with an application that can interpret the data of the self-describing management structure MIB in order to construct the device MIB;

detecting by the NMS that the device is present on the network;

accessing the self-describing management structure MIB of the device by the NMS to obtain, through conventional Simple Network Management Protocol (SNMP) commands, the data describing the device MIB structure, in response to the detecting step when the device MIB is not known to the NMS; and interpreting by the application the data describing the device MIB structure, thereby constructing the device MIB in the NMS.

2. The method of claim 1, wherein the providing step comprises the step of providing one of a MIB identifier and a MIB identifier plus a version number.

3. The method of claim 1, wherein the providing step comprises the step of providing a list of standard MIBs supported by the agent.

4. The method of claim 3, wherein the step of providing a list of standard MIBs supported by the agent comprises the steps of:

listing a Request for Comments (RFC) number that corresponds to each of the standard MIBs; and providing an indicator for indicating whether the corresponding MIB is supported by the agent, or merely referenced by the agent.

5. The method of claim 1, wherein the providing step comprises the step of providing a list of Abstract Syntax Notation One (ASN.1) types defined by the agent.

6. The method of claim 5, wherein the step of providing a list of ASN.1 types defined by the agent comprises the step of listing:

a name assigned to each ASN.1 type, and a parameter specifying how the ASN.1 type is declared.

7. The method of claim 1, wherein the providing step comprises the step of providing a list of MIB objects supported by the agent.

8. The method of claim 7, wherein the step of providing a list of MIB objects supported by the agent comprises the step of listing, for each MIB object, applicable predetermined fields specified by SNMP for defining an SNMP object.

9. The method of claim 1, wherein the providing step comprises the step of providing a list of traps supported by the agent.

10. The method of claim 9, wherein the step of providing a list of traps supported by the agent comprises the step of listing, for each trap, applicable predetermined fields required for defining an SNMP trap.

11. A network management station (NMS) in a data communication network for constructing in the NMS a device Management Information Base (MIB) for interfacing with a device, the NMS comprising:

a communication interface coupled to the network for communicating with the device; and a processing system coupled to the communication interface for controlling the device, wherein the processing system is programmed to:

interpret the data of a self-describing management structure MIB in order to construct the device MIB, the self-describing management structure MIB provided by the device from an agent that includes the self-describing management structure MIB, which provides data describing a device MIB structure supported by the device;

detect that the device is present on the network;

in response, access the self-describing management structure MIB of the device to obtain, through conventional Simple Network Management Protocol (SNMP) commands, the data describing the device MIB structure, when the device MIB is not known to the NMS; and interpret the data describing the device MIB structure, thereby constructing the device MIB in the NMS.

12. A device in a data communication network having a network management station (NMS) for constructing in the NMS a device Management Information Base (MIB) for interfacing with the device, comprising:

a communication interface coupled to the network for communicating with the NMS; and a processing system coupled to the communication interface for controlling the device, wherein the processing system is programmed with an agent including a self-describing management structure MIB, which provides data describing a device MIB structure supported by the device, and wherein the processing system is further programmed to communicate to the NMS the data describing the device MIB structure, in response to an access of the self-describing management structure MIB by the NMS, through conventional Simple Network Management Protocol (SNMP) commands, when the device MIB is not known to the NMS, thereby enabling the NMS to construct the device MIB in the NMS.

13. The device of claim 12, wherein the processing system is further programmed to communicate to the NMS one of a MIB identifier and a MIB identifier plus a version number.

14. The device of claim 12, wherein the processing system is further programmed to communicate to the NMS a list of standard MIBs supported by the agent.

15. The device of claim 14, wherein the processing system is further programmed to communicate to the NMS:

a Request for Comments (RFC) number that corresponds to each of the standard MIBs; and an indicator for indicating whether the corresponding MIB is supported by the agent, or merely referenced by the agent.

16. The device of claim 12, wherein the processing system is further programmed to communicate to the NMS a list of Abstract Syntax Notation One (ASN.1) types defined by the agent.

17. The device of claim 16, wherein the processing system is further programmed to communicate to the NMS:

a name assigned to each ASN.1 type, and a parameter specifying how the ASN.1 type is declared.

18. The device of claim 12, wherein the processing system is further programmed to communicate to the NMS a list of MIB objects supported by the agent.

19. The device of claim 18, wherein the processing system is further programmed to communicate for each MIB object, applicable predetermined fields specified by SNMP for defining an SNMP object.

20. The device of claim 12, wherein the processing system is further programmed to communicate to the NMS a list of traps supported by the agent.

* * * * *